(12) United States Patent
Lane et al.

(10) Patent No.: US 10,011,065 B2
(45) Date of Patent: Jul. 3, 2018

(54) PREFORM DESIGN FOR LIGHTWEIGHT CONTAINER

(71) Applicant: Amcor Group GmbH, Zurich (CH)

(72) Inventors: Michael T. Lane, Brooklyn, MI (US); Theodore F. Eberle, Ann Arbor, MI (US); Terry D. Patcheak, Ypsilanti, MI (US); James Stelzer, South Lyon, MI (US)

(73) Assignee: Amcor Group GmbH, Zurich (CH)

( * ) Notice: Subject to any disclaimer, the term of this patent is extended or adjusted under 35 U.S.C. 154(b) by 264 days.

(21) Appl. No.: 15/059,360

(22) Filed: Mar. 3, 2016

(65) Prior Publication Data

US 2017/0252958 A1    Sep. 7, 2017

(51) Int. Cl.
*B29C 49/00* (2006.01)
*B65D 1/02* (2006.01)
*B29C 49/08* (2006.01)
*B29C 49/06* (2006.01)
*B29K 67/00* (2006.01)
*B29L 31/00* (2006.01)

(52) U.S. Cl.
CPC .......... *B29C 49/0073* (2013.01); *B29C 49/08* (2013.01); *B65D 1/0284* (2013.01); *B29C 49/06* (2013.01); *B29K 2067/003* (2013.01); *B29L 2031/7158* (2013.01)

(58) Field of Classification Search
CPC ..... B29C 49/0073; B29C 49/08; B29C 49/06; B65D 1/0284; B29K 2067/003; B29L 2031/7158
See application file for complete search history.

(56) References Cited

U.S. PATENT DOCUMENTS 5,714,111 A * 2/1998 Beck ................... B29C 49/0073
215/375
2009/0155501 A1 * 6/2009 Witz ....................... B29B 11/14
428/34.1

\* cited by examiner

*Primary Examiner* — Michael C Miggins
(74) *Attorney, Agent, or Firm* — Harness, Dickey & Pierce, P.L.C.

(57) ABSTRACT

A preform configured to form a container by stretch blow molding. A finish portion is at a first end of the preform, and is a container finish. A tip portion is at a second end of the preform opposite to the first end, and is configured to form a container base and a container heel. The shoulder portion is adjacent to the finish portion and is between the finish portion and the tip portion. The shoulder portion is configured to form a container shoulder. The body portion is between the shoulder portion and the tip portion, and is configured to form a container body. The outer surface includes a flat portion at the tip portion.

17 Claims, 4 Drawing Sheets

| | Section | Total Mass(gm) | % |
|---|---|---|---|
| Shoulder Portion | 1 | 5.272 | 23 |
| Body Portion | 2 | 14.156 | 63 |
| Base/Heel Portion | 3 | 3.219 | 14 |

PREFORM DESIGN FOR LIGHTWEIGHT CONTAINER

FIELD

The present disclosure relates to a preform configured to be blow molded into a lightweight, hot-fill container.

BACKGROUND

This section provides background information related to the present disclosure, which is not necessarily prior art.

As a result of environmental and other concerns, plastic containers, more specifically polyester and even more specifically polyethylene terephthalate (PET) containers, are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

While current containers are suitable for their intended use, they are subject to improvement. For example, a container having reduced weight and increased strength, and a preform configured to form the container by stretch blow molding, would be desirable.

SUMMARY

This section provides a general summary of the disclosure, and is not a comprehensive disclosure of its full scope or all of its features.

The present teaching provide for a preform configured to form a container by stretch blow molding. The preform includes a finish portion, a tip portion, a shoulder portion, a body portion, and an outer surface. The finish portion is at a first end of the preform, and is a container finish of the container. The tip portion is at a second end of the preform opposite to the first end, and is configured to form a container base and a container heel of the container. The shoulder portion is adjacent to the finish portion and is between the finish portion and the tip portion. The shoulder portion is configured to form a container shoulder of the container. The body portion is between the shoulder portion and the tip portion, and is configured to form a container body of the container. The outer surface includes a flat portion at the tip portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
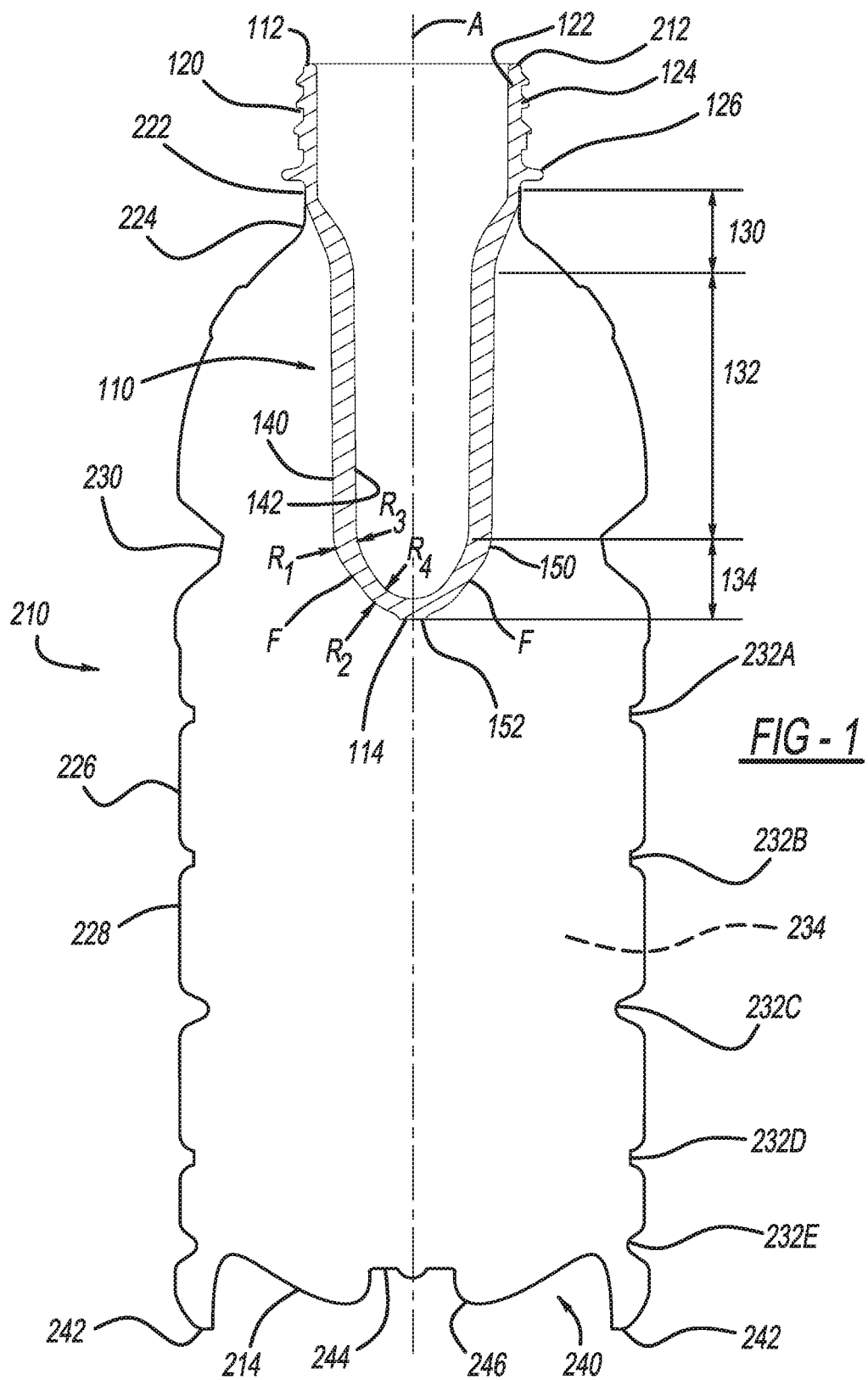
FIG. 1 is a cross-sectional view of a preform according to the present teachings, and a container according to the present teachings formed by stretch blow molding the preform.

With initial reference to FIG. 1, a preform according to the present teachings is generally illustrated at reference numeral 110. The preform 110 can be made of any suitable material. Any suitable polymeric material can be used, such as polyethylene terephthalate (PET) for example. The preform 110 can be formed in any suitable manner, such as by injection molding.

The preform 110 is configured to form container 210 in any suitable manner, such as by blow molding. The container 210 can be any suitable container of any suitable size, such as a 20 ounce, hot-fill container. The container 210 will be further described herein, after the description of the preform 110.

The preform 110 generally includes a first end 112 and a second end 114 opposite thereto. At the first end 112 is a finish portion 120 of the preform 110, which is also a container finish of the container 210. At the first end 112 the finish 120 defines an opening 122 of the preform 110, which also provides a container opening of the container 210. Extending from an outer surface of the finish 120 are threads 124, which can be any suitable threads configured to cooperate with a closure for closing the opening 122. Also extending from the finish 120 is a support ring 126, which can be used for supporting the preform 110 in a stretch blow molding machine, and which may provide the finish 120 with increased strength.

Between the finish 120 and the second end 114, the preform 110 includes a shoulder portion 130, a body portion 132, and a tip or base/heel portion 134. The shoulder portion 130 is adjacent to, or generally adjacent to, the finish 120. The base/heel portion 134 extends from the second end 114 towards the first end 112. The body portion 132 is between the shoulder portion 130 and the base/heel portion 134. As explained in detail herein, the shoulder portion 130 is configured to form a container shoulder 224 of the container 210, and may be configured to form a container neck 222 as well. The body portion 132 is configured to form a container main body portion 226 of the container 210. The base/heel portion 134 is configured to form a container base 240 and a container heel 242 of the container 210.

The preform 110 further includes an outer surface 140 and an inner surface 142, which is opposite to the outer surface 140. The inner and outer surfaces 140 and 142 extend about each one of the shoulder portion 130, the body portion 132, and the base/heel portion 134. The inner and outer surfaces 140 and 142 terminate prior to reaching the finish portion 120. At the base/heel portion 134, the outer surface 140 includes a flat portion F and a curved portion 150 on a side of the flat portion F opposite to the second end 114.

The preform 110 is generally circular, and is closed at the second end 114 by the base/heel portion 134. From the curved portion 150 the base/heel portion 134 tapers inward towards the second end 114. A longitudinal axis A of the preform 110 extends through an axial center of the opening 122 at the first end 112, and through an axial center of the base/heel portion 134 at the second end 114. The base/heel portion 134 includes a gate portion 152 for injecting plastic arranged such that the longitudinal axis A extends through the gate portion 152.

With continued reference to FIG. 1 and additional reference to FIG. 2A, the container 210 and the portions of the preform 110 that form different features of the container 210 will now be described in detail. The container 210 includes the finish 120 of the preform 110 at a first or upper end 212 of the container 210. A second or lower end 214 of the container 210 is opposite to the first end 212.

Extending from the finish 120 towards the second or lower end 214 is the container neck 222. From the container neck 222 extends a container shoulder 224. The container shoulder 224 extends to the container main body portion 226, which extends to the container base 240. The sidewall 228 of the container 210 forms at least the container shoulder 224, and the container main body portion 226. The sidewall 228 and the container base 240 together define an internal volume 234 of the container 210.

Between the container shoulder 224 and the container main body portion 226 is an inwardly tapered portion 230 defined by the sidewall 228. The sidewall 228 further defines a plurality of ribs 232A-232E. Any suitable number of ribs 232 can be provided, such as five ribs 232A to 232E as illustrated. The ribs 232 can be any suitable shape or size. For example, the rib 232C can be larger, or recessed further within the container 210, than the other ribs 232A, 232B, 232D, and 323E. The inwardly tapered portion 230 can be recessed further within the container 210 than each of the ribs 232A-232E as illustrated.

The container base 240 generally includes a heel 242 at the second or lower end 214. The base also includes a central portion 244. The longitudinal axis A of the container 210 extends through an axial center of the central portion 244. A diaphragm 246 is between the central portion 244 and the heel 242.

Figure 2A:
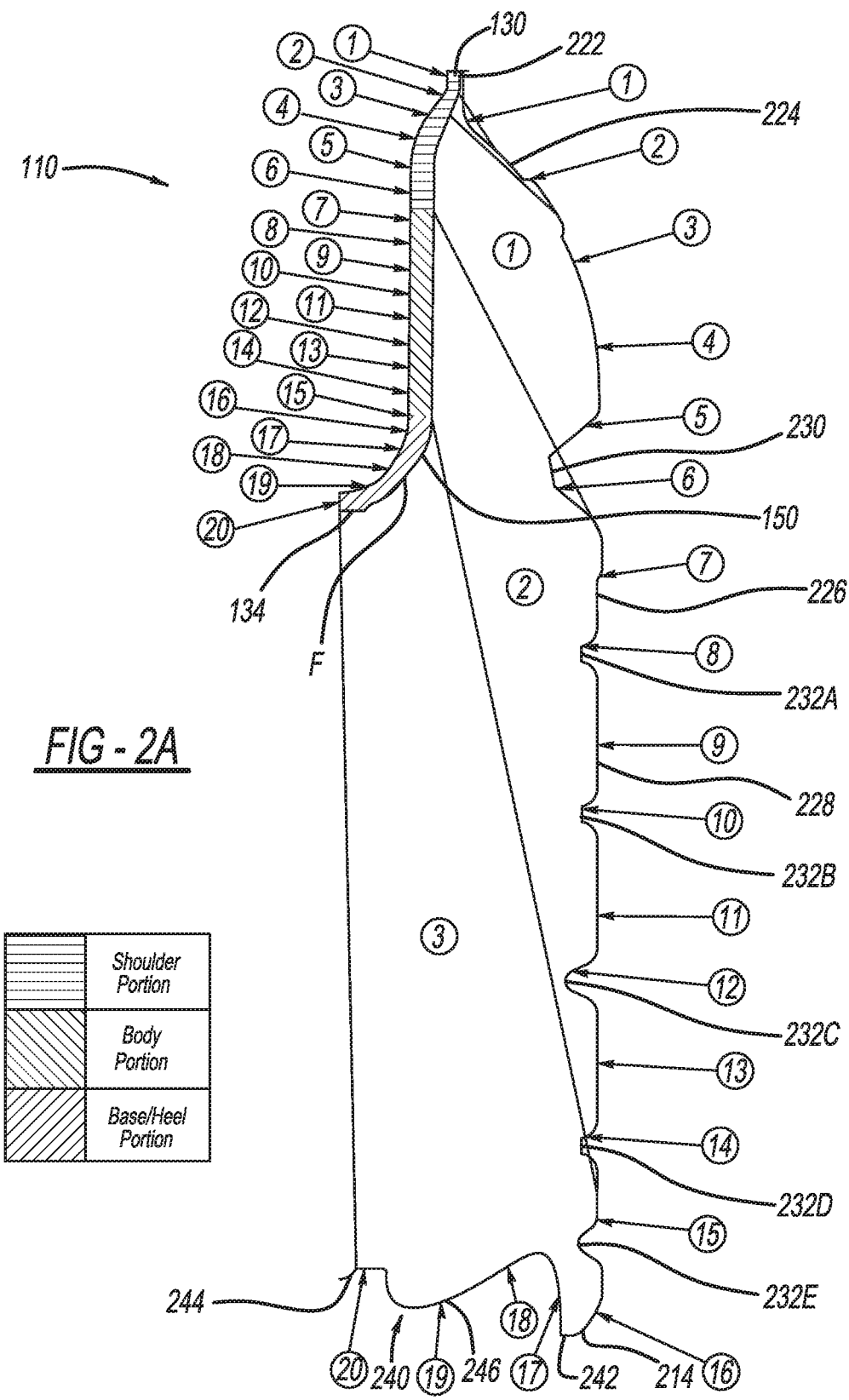
FIG. 2A is a cross-sectional view of one-half of the preform of FIG. 1 and one-half of the container of FIG. 1, portions of the preform are projected onto the container to illustrate the different portions of the container formed by different portions of the preform.
Figures 2B, 3B:
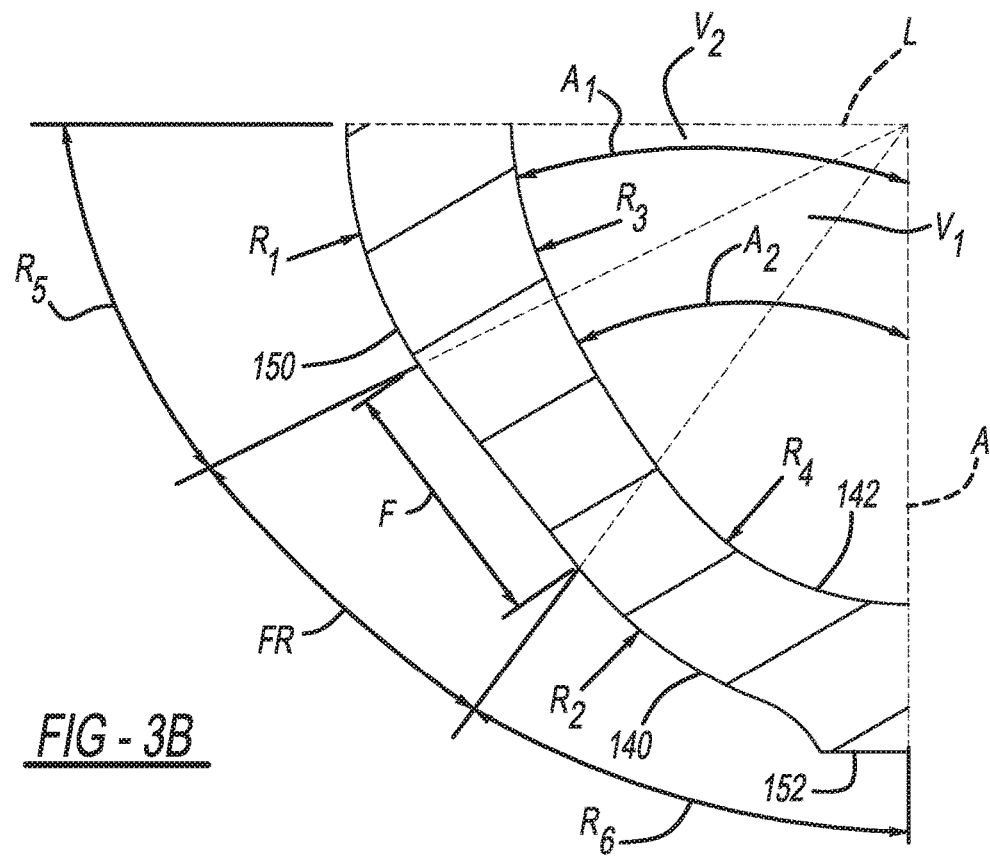
FIG. 2B is a chart of exemplary masses of sections of the preform.
FIG. 3B is a close up view of one-half of a base/heel portion of the preform in cross-section.

FIG. 2A identifies various sections of the preform 110 at reference numerals 1-3. Specifically, section 1 of the shoulder portion 130 of the preform 110 forms the container shoulder 224. Section 2 of the body portion 132 of the preform 110 forms the container main body portion 226. Section 3 of base/heel portion 134 of the preform 110 forms the container heel 242 and the container base 240. The flat portion F is included with the base/heel portion 134 of the preform 10, and forms portions of the container 210 at, and proximate to, the container heel 242. FIG. 2B provides exemplary masses for each one of the sections 1-3 of the container 210. The masses of FIG. 2B are merely exemplary and thus the sections 1-3 can each have any suitable mass, as well as any suitable size.

The container 210 can have any suitable dimensions or capacity. For example, the container 210 can have an overall diameter of about 2.4 inches, an overall height of about 7.7 inches, and an overall capacity of about 20 ounces. The container 210 can have about 1.5 grams of container material per ounce of container capacity. The preform 110 can further provide the container 210 with the heaviest material band in the heel 242 of the container, and the lightest material band at the base 240, for example, which facilitates movement of the base 240 to absorb vacuum forces when using any of the base designs disclosed in any of the following U.S. patent applications, for example, each of which is incorporated herein by reference: Ser. Nos. 14/238,789; 14/238,795; 14/465,494; and Ser. No. 14/424,569.

The preform 110 can be configured such that the container shoulder 224 can have the greatest wall thickness of the container 210, with the greatest thickness of the container shoulder 224 being proximate to the finish 120 and the support ring 126. The container shoulder 224 can have any suitable thickness, such as 0.012 inches, or about 0.012 inches. The container main body portion 226 can have any suitable wall thickness at the sidewall 228, such as 0.01 inches, or about 0.01 inches. The heel 242 can have any suitable thickness to provide added strength and rigidity. For example, the heel 242 can have a thickness of 0.01 inches, or about 0.01 inches. The base 240 can have the thinnest wall thickness of the container 210 to facilitate movement thereof in response to internal changes and pressure and vacuum. The base 240 can have any suitable thickness, such as 0.008 inches, or about 0.008 inches.

Figure 3A:
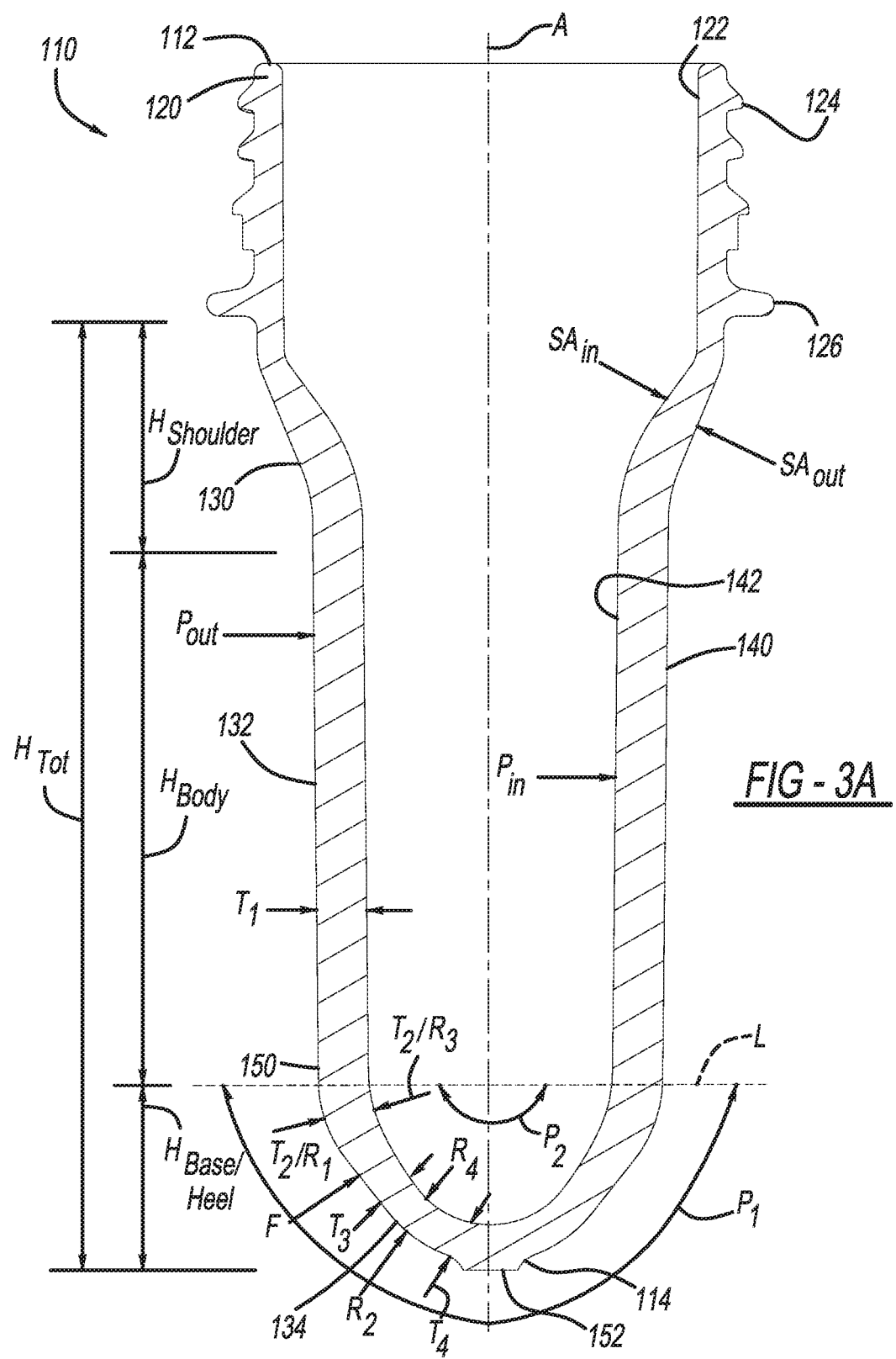
FIG. 3A is a cross-sectional view of the preform of FIG. 1.

With continued reference to FIGS. 1, 2A, and 2B, and additional reference to FIGS. 3A and 3B, various additional exemplary dimensions and features of the preform 110 will now be described. With specific reference to FIG. 3A, the preform 110 includes an outer perimeter $P_{out}$ at the outer surface 140. Opposite to $P_{out}$ is inner perimeter $P_{in}$, which is at the inner surface 142. The ratio of $P_{out}$ to $P_{in}$ can be 1:0.94, or can be about 1:0.94. Thus $P_{in}$ can be 94% of $P_{out}$, or can be about 94% of $P_{out}$. $P_{out}$ can be 78 millimeters, or about 78 millimeters. $P_{in}$ can be 73 millimeters, or about 73 millimeters.

The preform 110 further includes various thicknesses $T_1$, $T_2$, $T_3$, and $T_4$. $T_1$ is at the body portion 132, proximate to the base/heel portion 134. $T_2$ is at the curved portion 150 of the base/heel portion 134. $T_3$ is at the flat portion F. The flat portion F increases in thickness along its length in the direction from the second end 114 to the curved portion 150. Therefore, $T_3$ is thickest proximate to the curved portion 150. $T_4$ is at the base/heel portion 134 proximate to the second end 114. $T_2$ can be less than $T_1$, which can be greater than $T_3$. $T_3$ can be greater than or equal to $T_4$. $T_1$ can be 3.7 millimeters, or about 3.7 millimeters, which is about 9% greater than $T_2$. $T_2$ can be 3.4 millimeters, or about 3.38 millimeters. $T_3$ can be 2.8 millimeters, or about 2.8 millimeters. $T_4$ can be 2.8 millimeters, or about 2.8 millimeters.

The preform 110 further includes various curve radii $R_1$, $R_2$, $R_3$, and $R_4$. Curve radii $R_1$ and $R_2$ are each external curve radii, which are curved surfaces of the outer surface 140 of the preform 110. Curve radii $R_3$ and $R_4$ are internal radii at the inner surface 142 of the preform 110. Curve radius $R_1$ is less than curve radius $R_3$, which is greater than curve radius $R_2$. The curve radii $R_1$-$R_4$ can be any suitable size and shape. For example, curve radius $R_1$ can have a curved radius of 9.5 millimeters, or about 9.5 millimeters. Curve radius $R_2$ can be 9.5 millimeters, or about 9.5 millimeters. Curve radius $R_3$ can be 11 millimeters, or about 11 millimeters. Curve radius $R_4$ can be 7 millimeters, or about 7 millimeters.

The preform has a total height $H_{tot}$ extending from the second end 114 to the support ring 126, or about the support ring 126. The shoulder portion 130 of the preform 110 includes a height $H_{shoulder}$. The body portion 132 has a height $H_{body}$. The base/heel portion 134 includes a height $H_{base/heel}$. The dimensions of the different heights H can be any suitable dimensions, and can vary based on the desired size of the container 210. For example, the total height $H_{tot}$ can be 70.3 millimeters, or about 70.3 millimeters.

The height of the shoulder portion $H_{shoulder}$ can be 15 millimeters, or about 15 millimeters. The height of the shoulder portion $H_{shoulder}$ can be 22% of the total height $H_{tot}$, or about 22% of the total height $H_{tot}$. The volume of the preform 110 at the shoulder portion 130 can be 3.95 cm$^3$, or about 3.95 cm$^3$, which is 24% of a total volume of the preform 110, or about 24% of a total volume of the preform 110. The preform 110 can have a total volume of 16.8 cm$^3$.

The height of the body portion $H_{body}$ can be 41.3 millimeters, or about 41.3 millimeters. The height of the body $H_{body}$ can be 60% of the total height $H_{tot}$, or about 60% of the total height $H_{tot}$. The volume of the preform 110 at the body portion 132 can be 10.6 cm$^3$, or about 10.6 cm$^3$, which is 63% of the total volume of the preform 110, or about 63% of the total volume.

The height at the base/heel portion $H_{base/heel}$ can be 13.9 millimeters, or about 13.9 millimeters. The height $H_{base/heel}$ can be 20% of the total height $H_{tot}$, or about 20% of the total height $H_{tot}$. The volume at the base/heel portion 134 can be 2.4 cm$^3$, or about 2.4 cm$^3$, which can be 14% of the total volume of the preform 110, or about 14% of the total volume.

The preform 110 further includes a total surface area $SA_{out}$ at the outer surface 140, and a total surface area $SA_{in}$ at the inner surface 142. The $SA_{out}$ can be greater than the $SA_{in}$ and the ratio of the $SA_{out}$ to the $SA_{in}$ can be 1:0.71, or about 1:0.71. Therefore, the $SA_{in}$ can be 71%, or about 71%, of the $SA_{out}$. The $SA_{in}$ and the $SA_{out}$ can each be any suitable dimension. For example, the $SA_{in}$ can be 41.97 cm$^2$, or about 41.97 cm$^2$. The $SA_{out}$ can be 59.13 cm$^2$, or about 59.13 cm$^2$.

The base/heel portion 134 of the preform 110 can have an outer perimeter $P_1$, and an inner perimeter $P_2$. The outer perimeter $P_1$ is at the outer surface 140 of the preform 110, and the inner perimeter $P_2$ is at the inner surface 142. The outer perimeter $P_1$ can be greater than the inner perimeter $P_2$. A ratio of the outer perimeter $P_1$ to the inner perimeter $P_2$ can be 1:0.74, or about 1:0.74. Thus the inner perimeter $P_2$ can be 74%, or about 74%, of the outer perimeter $P_1$. The inner and outer perimeters $P_1$ and $P_2$ can each have any suitable dimension. For example, the outer perimeter $P_1$ can be 40.7 millimeters, or about 40.7 millimeters. The inner perimeter $P_2$ can be 30.1 millimeters, or about 30.1 millimeters.

With additional reference to FIG. 3B, the flat portion F can have any suitable length. For example, the flat portion F can have a length of 5.1 millimeters, or about 5.1 millimeters. With respect to an arc of 90° measured from the longitudinal axis A along the base/heel portion 134 to a line L that extends perpendicular to the longitudinal axis A and is generally where the body and base/heel portions 132 and 134 meet, the flat portion F can extend across radius FR, which is 24°, or about 24°. The flat portion F can define a volume $V_1$ of 0.665 cm$^3$, or about 0.665 cm$^3$, of the base/heel portion 134 as measured between the flat portion F and where the longitudinal axis A intersects line L.

Between the flat portion F and the line L is a radius $R_5$, which extends 29°, or about 29°, of the distance between the longitudinal axis A and the line L. The radius $R_5$ defines a volume $V_2$ of 1.258 cm$^3$, or about 1.258 cm$^3$, between the inner surface 142 and where the longitudinal axis A intersects the line L.

Between the flat portion F and longitudinal axis A is a radius $R_6$ of the base/heel portion 134, which extends 37°, or about 37°, of the distance between the longitudinal axis A and the line L. The flat portion F can be arranged such that it is angled at 38.5°, or about 38.5°, relative to the longitudinal axis A.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A preform configured to form a container by stretch blow molding, the preform comprising:
   a finish portion at a first end of the preform, the finish portion is a container finish of the container;
   a tip portion at a second end of the preform opposite to the first end, the tip portion configured to form a container base and a container heel of the container;
   a shoulder portion adjacent to the finish portion and between the finish portion and the tip portion, the shoulder portion configured to form a container shoulder of the container;
   a body portion between the shoulder portion and the tip portion, the body portion configured to form a container body of the container;
   an outer surface including a flat portion at the tip portion, the flat portion extends at an angle relative to a longitudinal axis of the preform;
   an inner surface opposite to the outer surface;
   a first outer curve radius of the outer surface on a first side of the flat portion;
   a second outer curve radius of the outer surface on a second side of the flat portion that is opposite to the first side, the first outer curve radius is closer to the body portion than the second outer curve radius;
   a first inner curve radius of the inner surface that is opposite to the first outer curve radius;
   a second inner curve radius of the inner surface that is opposite to the second outer curve radius;
   wherein the first outer curve radius and the second outer curve radius are each less than the first inner curve radius; and
   wherein the second inner curve radius is less than each one of the first outer curve radius, the second outer curve radius, and the first inner curve radius.

2. The preform of claim 1, wherein the preform is injection molded.

3. The preform of claim 1, wherein the preform is configured to form the container such that the container includes about 15 g of container material per ounce of container capacity.

4. The preform of claim 1, wherein the preform is configured to form the container such that the container heel includes a first material band and the container base includes a second material band, the first material band is a heaviest material band of the container, and the second material band is a lightest material band of the container.

5. The preform of claim 1, wherein the preform is configured to form the container such that the container is thickest at the container shoulder.

6. The preform of claim 1, wherein the preform is configured to form the container with a thickness of about 0.010 inches at the container body.

7. The preform of claim 1, wherein the preform is configured to form the container with a thickness of about 0.010 inches at the container heel.

8. The preform of claim 1, wherein the preform is configured to form the container such that the container is thinnest at the container base.

9. The preform of claim 1, wherein the preform is configured to form the container with a thickness of about 0.008 inches at the container base.

10. The preform of claim 1, wherein the tip portion is thickest adjacent to the body portion.

11. The preform of claim 1, wherein the preform includes a total inner surface area that is 71% of a total outer surface area.

12. The preform of claim 1, wherein the shoulder portion includes:
   a shoulder height that is 22% of a total height of the preform; and
   a shoulder volume that is 24% of a total volume of the preform.

13. The preform of claim 1, wherein the body portion includes a body height that is about 60% of a total height of the preform.

14. The preform of claim 1, wherein the tip portion includes:
   a tip height that is about 20% of a total height of the preform; and
   a tip volume that is about 14% of a total volume of the preform.

15. The preform of claim 1, wherein the preform is blow molded to form a container with an overall height of about 7.7 inches, overall diameter of about 2.9 inches, and overall capacity of 20 ounces.

16. The preform of claim 5, wherein the preform is configured to form the container with a thickness of about 0.012 inches at the shoulder.

17. The preform of claim 5, wherein the container shoulder is thickest at the container finish.

* * * * *